United States Patent
Iverson et al.

(10) Patent No.: US 8,832,345 B2
(45) Date of Patent: Sep. 9, 2014

(54) SYSTEM FOR COMMUNICATING BETWEEN TWO ELECTRICAL DEVICES AND METHOD THEREFORE

(75) Inventors: Kent Iverson, Hermosa Beach, CA (US); Brian Van Harlingen, Torrance, CA (US); Vannin Gale, Anaheim Hills, CA (US); Frank Kelly, Thousand Oaks, CA (US); John M. Norton, Santa Clarita, CA (US)

(73) Assignee: Belkin International, Inc., Playa Vista, CA (US)

( * ) Notice: Subject to any disclaimer, the term of this patent is extended or adjusted under 35 U.S.C. 154(b) by 320 days.

(21) Appl. No.: 12/965,397

(22) Filed: Dec. 10, 2010

(65) Prior Publication Data

US 2012/0054400 A1    Mar. 1, 2012

Related U.S. Application Data

(60) Provisional application No. 61/376,435, filed on Aug. 24, 2010.

(51) Int. Cl.
*G06F 13/00* (2006.01)

(52) U.S. Cl.
USPC ............. 710/303; 710/106; 710/110; 718/1

(58) Field of Classification Search
USPC ................. 710/106, 110, 303; 718/1
See application file for complete search history.

(56) References Cited

U.S. PATENT DOCUMENTS

| | | |
|---|---|---|
| 7,885,645 B2 | 2/2011 | Postma et al. |
| 8,099,090 B2 | 1/2012 | Postma et al. |
| 2002/0172336 A1 | 11/2002 | Postma et al. |
| 2012/0088481 A1 | 4/2012 | Postma et al. |

*Primary Examiner* — Matthew D Spittle
(74) *Attorney, Agent, or Firm* — Bryan Cave LLP

(57) ABSTRACT

In some embodiments, a system can be configured to communicate to and from a media device. The media device can include a first controller. The system can include: (a) a software module configured to run on the first controller; (b) a physical device module configured to run on the first controller; (c) a virtual host module configured to run on the first controller; and (e) a docking station having: (1) a second controller; (2) an electrical connector configured to couple to the media device; (3) a physical host module configured to run on the second controller; (4) a virtual device module configured to run on the second controller; and (5) one or more accessory devices configured to communicate with the media device using the virtual device module. In some examples, the physical host module and the physical device module are configured to establish a physical communications pipe between the media device and the docking station. The virtual host module and the virtual device module can be configured to establish a virtual communications pipe between the media device and the docking station using the physical communications pipe. Other embodiments are disclosed.

21 Claims, 7 Drawing Sheets

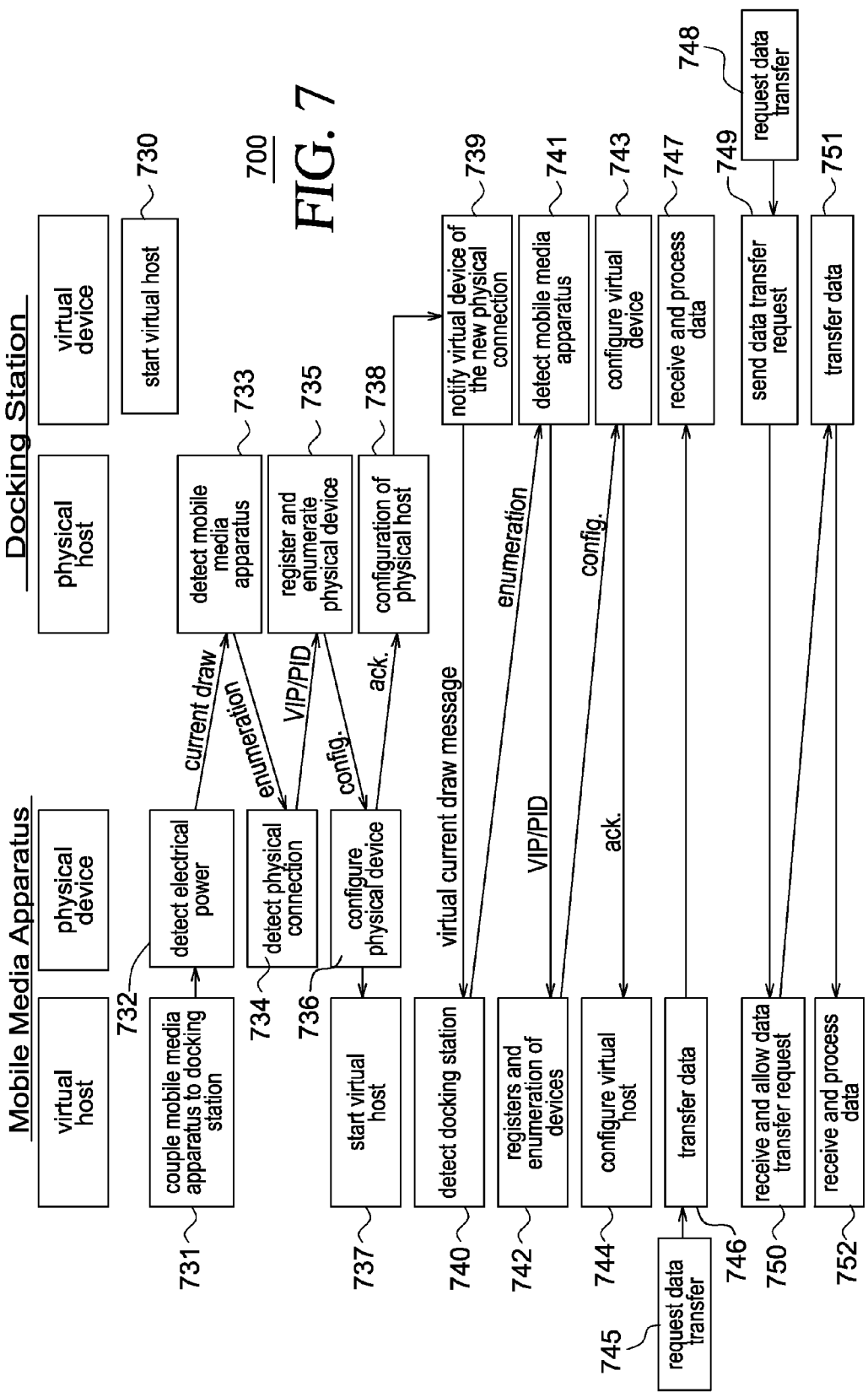

SYSTEM FOR COMMUNICATING BETWEEN TWO ELECTRICAL DEVICES AND METHOD THEREFORE

CROSS-REFERENCE TO RELATED APPLICATIONS

This application claims the benefit of U.S. Provisional Application No. 61/376,435, filed Aug. 24, 2010. U.S. Provisional Application No. 61/376,435 is incorporated herein by reference.

FIELD OF THE INVENTION

This invention relates generally to systems for communicating between two electrical devices, and relates more particularly to methods of communication between two electrical devices and to systems configured to allow a first electrical device of the two electrical devices to control the communications between the two electrical devices while a second electrical device of the two electrical devices provides electrical power to the first electrical device.

DESCRIPTION OF THE BACKGROUND

When universal serial bus (USB) connectors of a first and second electrical apparatus are coupled together, the first electrical apparatus can provide electrical power to the second electrical apparatus. Under traditional USB specifications (e.g., the USB 1.0, 2.0, and/or 3.0 specification), the first electrical apparatus providing electrical power must be the physical host (i.e., the master), and the second electrical apparatus, which receiving the electrical power, must be the physical device (i.e., the slave).

In some situations, however, it can be preferable for the electrical apparatus receiving the electrical power to be the host, but this reversal of roles is not allowed under the USB specification. A new standard, called USB On The Go, has been created to handle this situation, but many mobile media apparatuses do not operate under this new standard.

Accordingly, a need exists for a system and method that allows a first electrical apparatus to act as the host while receiving electrical power from a second electrical apparatus and while also complying with the traditional USB specifications.

BRIEF DESCRIPTION OF THE DRAWINGS

To facilitate further description of the embodiments, the following drawings are provided in which:

FIG. 7 illustrates an interaction flow chart of a method of communicating between a mobile media apparatus and a docking station, according to a second embodiment.

Figure 1:
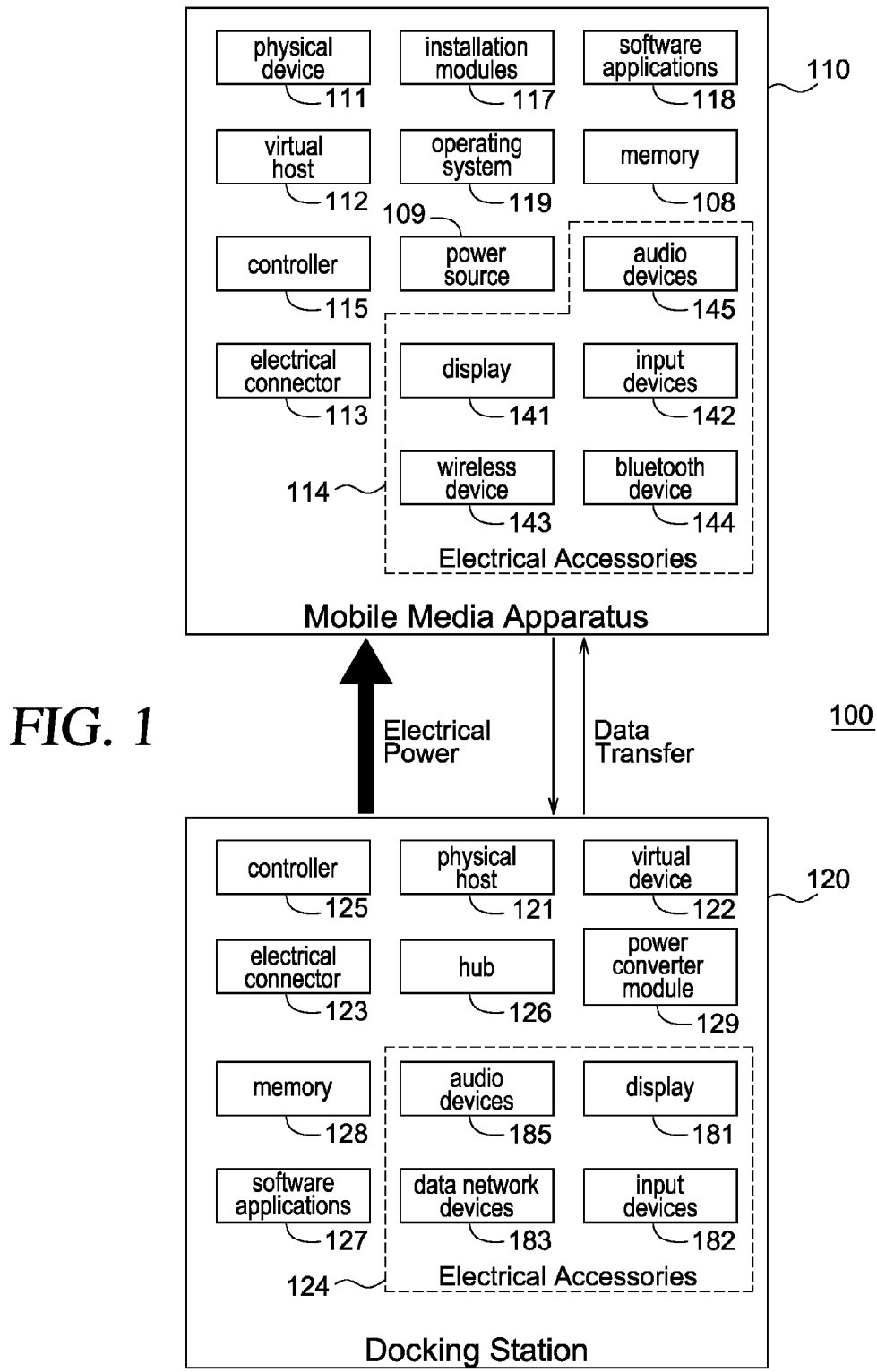
FIG. 1 is a block diagram illustrating a system of communicating between a mobile media apparatus and a docking station, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Various embodiments teach a system configured to communicate to and from a media device. The media device can include a first controller. The system can include: (a) a physical device module configured to run on the first controller; (b) a virtual host module configured to run on the first controller; and (c) a docking station having: (1) a second controller; (2) an electrical connector configured to couple to the media device; (3) a physical host module configured to run on the second controller; (4) a virtual device module configured to run on the second controller; and (5) one or more accessory devices configured to communicate with the media device using the virtual device module. In some examples, the physical host module and the physical device module are configured to establish a physical communications pipe between the media device and the docking station. The virtual host module and the virtual device module can be configured to establish a virtual communications pipe between the media device and the docking station using the physical communications pipe.

Additional embodiments teach a mobile media apparatus configured to communicate with a docking station. The mobile media apparatus can include a first electrical connector and a controller. The first electrical connector can be configured to couple to the docking station. The docking station can include a physical host and a virtual device. The mobile media apparatus can further include: (a) a virtual host configured to run on the controller; and (b) a physical device configured to run on the controller and further configured to communicate with the physical host of the docking station using the first electrical connector such that a physical signal path is created with the physical host of the docking station when the first electrical connector of the mobile media apparatus is coupled to the docking station. The virtual host can be further configured to establish a virtual signal path with the virtual device of the docking station over the physical signal path when the first electrical connector of the mobile media apparatus is coupled to the docking station. The virtual host can be further configured to control communications with the virtual device of the docking station using the virtual signal path. The physical device can be further configured such that communications using the physical signal path by the physical device is controlled by the physical host of the docking station. The virtual host can be further configured to communicate data to the virtual device of the docking station using the virtual signal path when the first electrical connector of the mobile media apparatus is coupled to the docking station and while the first electrical connector of mobile media apparatus is receiving electrical power from the docking station.

Other embodiments teach a docking station configured to communicate with a mobile media apparatus. The mobile media apparatus can include an electrical connector, a virtual host, and a physical device. The docking station can include: (a) a processor; (b) a first electrical connector configured to couple to the electrical connector of the mobile media apparatus; (c) a virtual device configured to run on the processor; and (d) a physical host configured to run on the processor and further configured to communicate with the physical device of the mobile media apparatus using the first electrical connector such that a physical signal path is created with the physical device of the mobile media apparatus when the first electrical connector of the docking station is coupled to the electrical connector of the mobile media apparatus. In some examples, the virtual device is further configured to establish a virtual signal path with the virtual host of mobile media apparatus over the physical signal path when the first electrical connector of the docking station is coupled to electrical connector of the mobile media apparatus. The physical host can be further configured to control communications with the physical device of the mobile media apparatus using the physical signal path. The virtual device can be further configured such that communication using the virtual signal path by the virtual device is controlled by the virtual host of the mobile media apparatus. The virtual device can be further configured to communicate data to the virtual host of the mobile media apparatus using the virtual signal path when the electrical connector of the mobile media apparatus is coupled to first electrical connector of the docking station and while the first electrical connector of docking station is providing first electrical power to the electrical connector of the mobile media apparatus.

Some embodiments teach a method of communicating between a mobile media apparatus and a docking station. The mobile media apparatus can include a virtual host and a physical device. The docking station can include a physical host and a virtual device. The method can include: initializing a physical connection between the physical device of the mobile media apparatus and the physical host of the docking station when the docking station is coupled to the mobile media apparatus; after initializing the physical connection, initializing a virtual connection between the virtual host of the mobile media apparatus and the virtual device of the docking station wherein the virtual connection is using the physical connection; and transferring data between the virtual host of the mobile media apparatus and the virtual device of the docking station using the virtual connection while the mobile media apparatus is receiving electrical power from the docking station and while the docking station is coupled to the mobile media apparatus.

Turning to the drawings, FIG. 1 is a block diagram illustrating a system 100 of communicating between a mobile media apparatus 110 and a docking station 120, according to a first embodiment. System 100 is a communications system that allows mobile media apparatus 110 to act as a host (i.e., master) and docking station 120 to act as a device (i.e., slave) while mobile media apparatus 110 is receiving electrical power from docking station 120. Furthermore, system 100 can comply with one or more of the traditional USB specifications, even though the host is receiving electrical power from the device. System 100 is merely exemplary and is not limited to the embodiments presented herein. System 100 can be employed in many different embodiments or examples not specifically depicted or described herein. In some examples, system 100 can include: (a) at least part of mobile media apparatus 110; and (b) at least part of docking station 120.

Mobile media apparatus 110 can be configured to communicate with docking station 120. In some embodiments, mobile media apparatus 110 is an electrical device configured to produce and receive electrical signals. For example, mobile media apparatus 110 can be a cellular (or mobile) phone, an audio playback device, a portable AM (amplitude modulated) and FM (frequency modulated) radio, a satellite radio, a portable CD (compact disk) or DVD (digital video disk) player, a data storage device, an audio player, an audio-visual player, and/or a portable media (e.g., MP3) player. The term "mobile media apparatus" includes electrical devices of all types and designs, including, but not limited to, any of the types of devices described above and/or any combination thereof. For example, mobile media apparatus 110 can be an electrical device manufactured by Sony Corp., Philips Corp., Audiovox Corp., Verizon Communications, Inc., Microsoft Corp. (e.g., the Zune® MP3 player), Motorola (e.g., the Droid™ device), Research in Motion Limited (e.g., the Blackberry® device), Palm, Inc. (e.g., the Palm® device), or Apple Computer, Inc. (e.g., the iPod® device, the iTouch® device, the iPad® device, and/or the iPhone® device).

In various embodiments, a media device or mobile media apparatus 110 can include: (a) at least one electrical connector 113; (b) one or more accessory devices or electrical accessories 114; (c) a controller 115 (e.g., a microprocessor, a processor, a microcontroller, or another type of controller); (d) a physical device 111 configured to run on controller 115; (e) a virtual host 112 configured to run on controller 115; (f) one or more installation modules 117 configured to run on controller 115; (g) one or more software applications 118 configured to run on controller 115; (h) an operating system 119 configured to run on controller 115; (i) memory 108; and (j) a power source 109.

Electrical connector 113 can be configured to couple to a complementary electrical connector 123 of docking station 120. In some examples, electrical connector 113 can be a USB connector, specifically, a female USB connector. In other examples, electrical connector can be a Firewire® connector or another proprietary or non-proprietary connector.

In some examples, electrical connector 113 can include one or more power pins and one or more data pins. Electrical connector 113 can be configured to receive electrical power from docking station 120 via the one or more power pins. Furthermore, electrical connector 113 can be configured such that physical device 111 can communicate with physical host 121 via the one or more data pins.

In some examples, electrical accessories 114 can include: (a) at least one display 141 (e.g., an LCD (liquid crystal display) and/or one or more LEDs (light emitting diodes); (b) one or more input devices 142 (e.g., one or more buttons, a keypad, and/or a touch screen); (c) a Bluetooth® device 144; (d) a wireless device 143 (e.g., a Wi-Fi device and/or a cellular telephone device); and/or (e) one or more audio devices 145 (e.g., one or more audio speakers, audio connectors, and/or a microphone). In other examples, mobile media apparatus 110 can include other electrical accessories.

Software applications 118 can include one or more software programs with various functionalities that are stored in memory 108 and configured to run on controller 115. In some examples, at least some of the one or more software applications 118 can be configured to communicate with docking station 120 via the virtual communications pipe (described below). From the point of view of software applications 118 (and electrical accessories 114), physical device 111 is hidden, and virtual host 112 is the USB driver for mobile media apparatus 110. Installation modules 117 can be stored in memory 108 and be configured to install virtual host 112 and/or physical device 111 in operating system 119.

In various embodiments, operating system 119 can include software programs that manage the hardware and software resources of mobile media apparatus 110. Operating system 119 can perform basic tasks such as, for example, controlling and allocating memory, prioritizing the processing of instructions, controlling input and output devices, facilitating networking, and managing files. Common operating systems for mobile media devices include the iPhone® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows Mobile operating system by Microsoft Corp. of Redmond, Wash., and a Symbian operating system by Nokia Corp. of Espoo, Finland.

Figure 2:
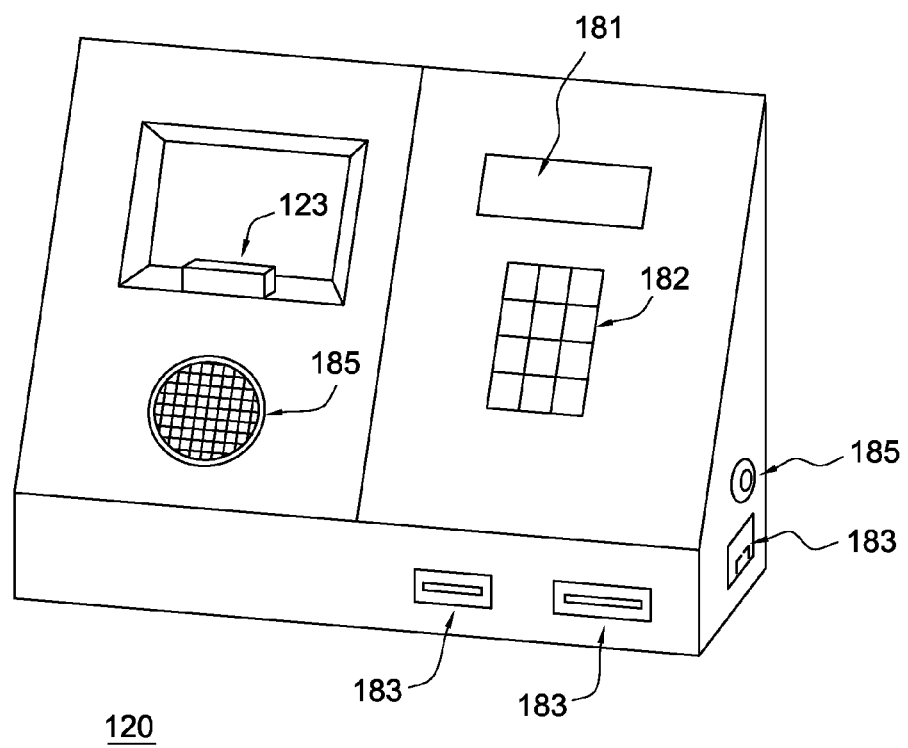
FIG. 2 is a front view illustrating the docking station of FIG. 1, according to the first embodiment.

Docking station 120 can be configured to communicate with mobile media apparatus 110. In some examples, docking station 120 can be a docking station configured to receive mobile media apparatus 110. FIG. 2 is a front view illustrating docking station 120, according to the first embodiment.

Referring to FIGS. 1 and 2, in many embodiments, docking station 120 can include: (a) a controller 125 (e.g., a microprocessor, a processor, a microcontroller, or another type of controller); (b) a hub 126; (c) one or more accessory devices or electrical accessories 124; (d) at least one electrical connector 123; (e) a power converter module 129; (f) a software applications 127 configured to run on controller 125; (g) a physical host 121 configured to run on controller 125; (h) a virtual device 122 configured to run on controller 125; and (i) memory 128.

In some examples, hub 126 can be electrically coupled to controller 125, electrical connector 123, power converter module 129, and electrical accessories 124. In one example, the upstream port of hub 126 is coupled to electrical connector 123 (and/or power converter module 129), and the downstream ports of hub 126 can be coupled to electrical accessories 124 and/or controller 125. Controller 125 can control hub 126, and power converter module 129 can provide electrical power to hub 126. In many examples, hub 126 is a USB hub.

Electrical connector 123 can be configured to couple to a complementary electrical connector 113 in mobile media apparatus 110. In some examples, electrical connector 123 can be a USB connector, specifically, a male USB connector. In other examples, electrical connector 123 can be a Firewire® connector or another proprietary or non-proprietary connector.

In some examples, electrical connector 123 can include one or more power pins and one or more data pins. Electrical connector 123 can be configured to provide electrical power from power converter module 129 to mobile media apparatus 110 via the one or more power pins. Furthermore, electrical connector 123 can be configured such that physical host 121 can communicate with physical device 111 via the one or more data pins.

In some examples, electrical accessories 124 can include: (a) at least one display 181 (e.g., an LCD and/or one or more LEDs); (b) one or more input devices 182 (e.g., one or more buttons, a keypad, and/or a touch screen); (c) one or more data network devices 183 (e.g., a Wi-Fi device, a cellular or landline telephone device, and/or an Ethernet adapter) configured to couple to a data network, where data network devices 183 can include an electrical connector (e.g., a Ethernet connector and/or a telephone network adapter); and/or (e) one or more audio devices 185 (e.g., one or more audio speakers, one or more audio connectors, and/or a microphone). In other examples, docking station 120 can include other electrical accessories.

Software applications 127 can include one or more software programs with various functionalities that are stored in memory 128 and configured to run on controller 125. In some examples, at least some of the one or more software applications 127 can be configured to communicate with mobile media device 110 via the virtual communications pipe (described below). From the point of view of software applications 127 (and electrical accessories 124), physical host 121 is hidden, and virtual device 122 is the USB driver for docking station 120.

Power converter module 129 can be configured to receive first electrical power from an external power source and can be further configured to provide second electrical power (e.g., +5 volts DC (direct current)) to mobile media apparatus 110 when electrical connector 113 is coupled to electrical connector 123. Electrical connector 123 is configured to provide the second electrical power from power converter module 129 to electrical connector 113. That is, power converter module 129 can provide electrical power to mobile media apparatus 110. In some examples, power converter module 129 can include a power adapter that can be plugged into an electrical wall outlet. In the same or different examples, power converter module 129 can receive electrical power from an Ethernet adapter if docking station 120 is using a power from an Ethernet system.

Physical host 121 and physical device 111 are configured to establish a physical communications pipe or physical signal path between mobile media apparatus 110 and docking station 120. That is, physical host 121 can be configured to communicate with physical device 111 such that the physical communications pipe is created with physical device 111 of mobile media apparatus 110 when electrical connector 123 is coupled to electrical connector 113. Physical host 121 is further configured to control communications with physical device 111 on the physical communications pipe.

Correspondingly, physical device 111 can be configured to communicate with physical host 121 of docking station 120 such that the physical communications pipe or the physical signal path is created with physical host 121 of docking station 120 when electrical connector 113 is coupled to electrical connector 123. Physical device 111 is further configured such that communication on the physical communications pipe by physical device 111 is controlled by physical host 121 when electrical connector 113 is coupled to electrical connector 123. The communications can be performed using (i.e., via) electrical connector 113 and electrical connector 123.

In many examples, physical host 121 can be a USB physical host. Similarly, physical device 111 can be a USB physical device. In these examples, physical device 111 and physical host 121 can be designed, initialized and communicate in compliance with traditional USB specifications. For example, the physical signal path between physical device 111 and physical host 121 can be initialized using the method described in the USB 2.0 specification. In other examples, physical device 111 and physical host 121 can communicate using a method described in the USB 3.0 specification or subsequent USB specifications.

Generally, under the traditional USB specifications, the physical host (i.e., docking station 120) would control the physical device (i.e., mobile media apparatus 110), but as described below, system 100 allows the physical device to control the physical host through use of virtual devices and virtual hosts. Virtual host 112 and virtual device 122 are configured to establish a virtual communications pipe between mobile media apparatus 110 and docking station 120 using the physical communications pipe. That is, the virtual communications pipe is formed on top of the physical communications pipe so the physical communications pipe is effectively hidden from or invisible to any electrical accessories or software application using the data connection between mobile media apparatus 110 and docking station 120 provided by the coupling of electrical connectors 113 and 123. Use of a single virtual host and virtual device are described herein. However, in other examples, two or more virtual hosts and two or more virtual devices can be used with each of the two or more virtual communications pipes formed on top of the physical communications pipe.

Virtual host 112 can be configured to establish a virtual communications pipe or a virtual signal path with virtual device 122 of docking station 120 on top of the physical communications pipe when electrical connector 113 is coupled to electrical connector 123. Furthermore, virtual host 112 is further configured to control communications with virtual device 122 on the virtual communications pipe. Virtual host 112 can also be configured to communicate data to virtual device 122 using the virtual communications pipe when electrical connector 113 is coupled to electrical connector 123 and when electrical connector 113 is receiving electrical power from electrical connector 123.

Correspondingly, virtual device 122 can be configured to establish the virtual signal path or the virtual communications pipe with virtual host 112 on top of the physical communications pipe when electrical connector 113 is coupled to electrical connector 123. Virtual device 122 is further configured such that communication on the virtual communications pipe by virtual device 122 is controlled by virtual host 112.

In many embodiments, virtual host 112 can be a virtual USB host. Similarly, virtual device 122 can be a virtual USB device. A virtual USB host and device can be similar to a physical USB host and device, respectively, with some adjustments to the USB specification to account for the lack of a direct physical connection (i.e., lack of access to the physical connection between electrical connectors 113 and 123). That is, exchange of communication packets over the physical communication pipe can replace detection of physical events (e.g., a voltage on a pin of an electrical connector) in some examples.

In many examples, electrical accessories 114 and software applications 118 can be configured to communicate with docking station 120 using virtual host 112. Electrical accessories 124 and software applications 127 can be configured to communicate with mobile media apparatus 110 using virtual device 122.

Docking station 120 can be configured to provide electrical power to mobile media apparatus 110 when electrical connector 123 is coupled to electrical connector 113 and while the physical communications pipe and the virtual communications pipe exist between virtual host 112 and physical device 111 of media device 110 and virtual device 122 and physical host 121 of docking station 120, respectively.

Electrical power can be provided from docking station 120 to mobile media apparatus 110 while docking station 120 is the physical host because of the use of virtual host 112 and virtual device 122. Virtual host 112 and virtual device 122 allow mobile media apparatus 110 to act as the USB host while docking station 120 is providing electrical power to mobile media apparatus 110. Furthermore, virtual host 112 and virtual device 122 can make it appear to electrical accessories and other software applications that mobile media apparatus 110 is the USB host and docking station 120 is the USB device.

In many examples, mobile media apparatus 110 can include a cellular phone, and docking station 120 can include a desktop cradle for mobile media apparatus 110. When mobile media apparatus 110 is coupled to docking station 120, docking station 120 can charge the batteries (i.e., power source 109) of mobile media apparatus 110. Also, in some examples, docking station 120 can function as a speakerphone or hand-held phone (including a keypad) for mobile media apparatus 110. That is, at least part of the data transmitted between mobile media apparatus 110 and docking station 120 can be voice data from the cellular phone of mobile media apparatus 110. In the same or different embodiments, docking station 120 can also function as an internet and/or data hub that couples mobile media apparatus 110 to the internet or a private data network.

When mobile media apparatus 110 is running, program instructions stored in memory 108 are executed by controller 115. A portion of the program instructions stored in memory 108, can be suitable for carrying out at least a portion of method 300 (FIG. 3) and/or 700 (FIG. 7) performed by mobile media apparatus 110 as described below or to implement physical device 111, virtual host 112, software applications 118, operating system 119, and/or installation modules 117.

Similarly, when docking station 120 is running, program instructions stored in memory 128 are executed by controller 125. A portion of the program instructions, stored in memory 128, can be suitable for carrying out at least a portion of method 300 (FIG. 3) and/or 700 (FIG. 7) performed by docking station 120 as described below or to implement software applications 127, physical host 121, and/or virtual device 122.

Figure 3:
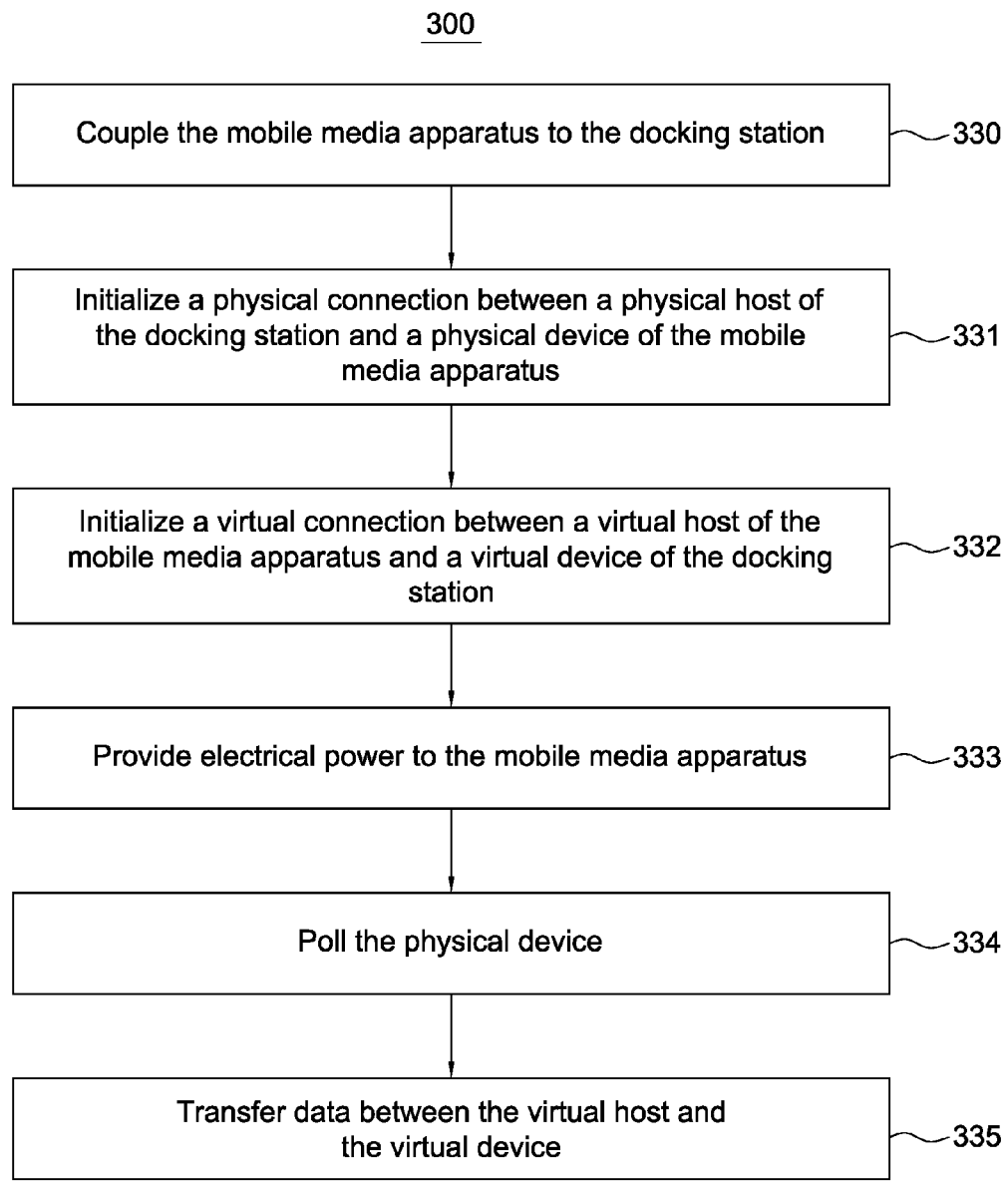
FIG. 3 illustrates a flow chart for an example of a method of communicating between a mobile media apparatus and a docking station, according to the first embodiment.

FIG. 3 illustrates a flow chart for an example of a method 300 of communicating between a mobile media apparatus and a docking station, according to the first embodiment. Method 300 is merely exemplary and is not limited to the embodiments presented herein. Method 300 can be employed in many different embodiments or examples not specifically depicted or described herein. In some embodiments, the activities, the procedures, and/or the processes of method 300 can be performed in the order presented. In other embodiments, the activities, the procedures, and/or the processes of method 300 can be performed in any other suitable order. In still other embodiments, one or more of the activities, the procedures, and/or the processes in method 300 can be combined or skipped.

Referring to FIG. 3, method 300 can include an activity 330 of coupling the mobile media apparatus to the docking station. In some examples, a user can couple a USB connector on the mobile media device to a USB connector on the docking station. In other examples, the docking station and/or the mobile media apparatus can be powered on while they are coupled. In various embodiments, the mobile media apparatus and the docking station can be similar to or the same as mobile media apparatus 110 and docking station 120, respectively, of FIG. 1.

Method 300 in FIG. 3 continues with an activity 331 of initializing a physical connection between the physical host of the docking station and the physical device of the mobile media apparatus.

Figure 4:
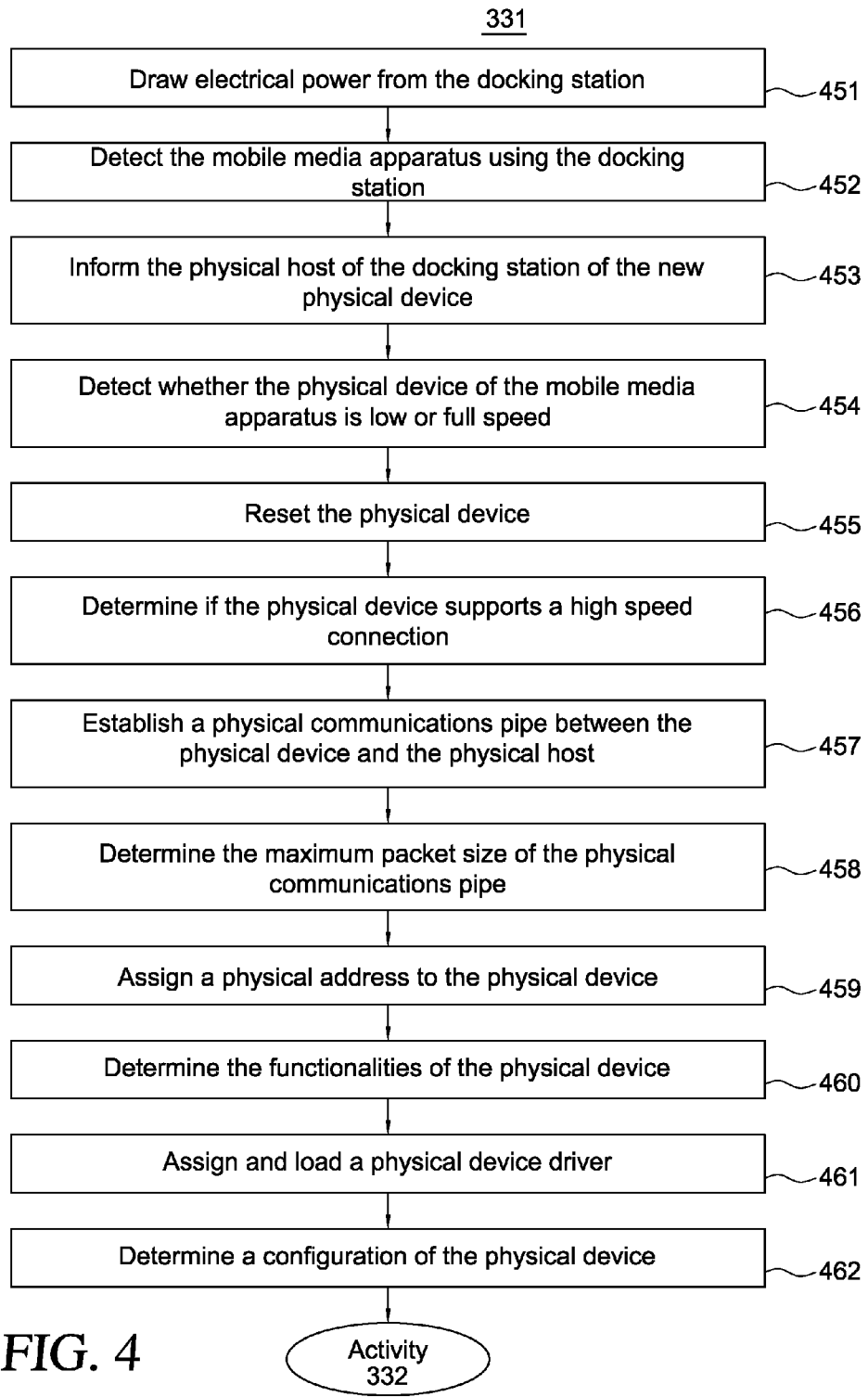
FIG. 4 is a flow chart illustrating an example of activity of initializing a physical connection between the physical host of the docking station and the physical device of the mobile media apparatus, according to the first embodiment.

FIG. 4 is a flow chart illustrating an example of activity 331, according to the first embodiment. Activity 331 shown in FIG. 4 is merely exemplary and is not limited to the embodiments presented herein. The procedures of activity 331 below are a typical sequence of events that occurs during enumeration of a USB 2.0 device, according to some examples. Activity 331 can be employed in many different embodiments or examples not specifically depicted or described herein. For example, activity 331 could vary if the docking station and the mobile media apparatus were being initialized under a different standard (e.g., USB 1.0 or USB 3.0). In some embodiments, the procedures of activity 331 can be performed in the order presented. In other embodiments, the procedures of activity 331 can be performed in any other suitable order. In still other embodiments, one or more of the procedures in activity 331 can be combined or skipped.

Referring to FIG. 4, the first procedure in activity 331 is a procedure 451 of drawing electrical power from the docking station. For example, the mobile media apparatus can begin to drawing electrical power from the docking station. In some examples, drawing power from the docking station can put the mobile media apparatus in a powered state. The mobile media apparatus can draw up to 100 mA (milliamperes) from the docking station through a USB connector on the mobile media apparatus.

Activity 331 in FIG. 4 continues with a procedure 452 of detecting the mobile media apparatus by the docking station. The docking station can monitor the voltages on the signal lines (D+ and D−) on its USB connector. The docking station can have a pull-down resistor of 14.25 k-24.8 kW on each line in some examples. The mobile media apparatus can have a pull-up resistor of 900-1575 W on D+ for a full-speed device or on D− for a low-speed device in the same or different examples. When the mobile media apparatus is coupled to the docking station, the pull-up resistor of the mobile media apparatus forces the line high, enabling the docking station to detect when a mobile media apparatus is attached. When detecting a mobile media apparatus, the docking station continues to provide electrical power, but does not transmit USB traffic to the mobile media apparatus. In some examples, the docking station waits for at least 100 milliseconds after detecting the mobile media apparatus to allow the electrical connectors of the mobile media apparatus and the docking station to be fully connected and for the electrical power to stabilize on the mobile media apparatus before beginning procedure 453.

Next, activity 331 of FIG. 4 includes a procedure 453 of informing the physical host of the docking station of the new physical device. The hub of the docking station can use an interrupt to report that the new physical device is coupled to the controller of the docking station. The interrupt indicates which hub (if more than one) and/or which port (if more than one, and, if so, which port) has experienced an event.

Subsequently, activity 331 of FIG. 4 includes a procedure 454 of detecting whether the physical device of the mobile media apparatus is a low or full speed device. The docking station can determine whether the physical device of the mobile media apparatus is low or full speed by examining the voltages on the two signal lines. The docking station can detect the physical device's speed by determining which line has a higher voltage when idle. In many examples, the physical device of the mobile media apparatus and the physical host of the docking station are full speed physical devices.

Activity 331 in FIG. 4 continues with a procedure 455 of resetting the physical device. The physical host can send a standard USB request to instruct the physical device to reset. In one example, the docking station places the physical device's USB data lines in the reset condition for at least 10 milliseconds. In one example, the reset condition is triggered by pulling both D+ and D− into a logic low state.

Next, activity 331 of FIG. 4 includes a procedure 456 of determining if the physical device supports a high-speed connection. The docking station can detect whether the physical device supports a high-speed connection using two special signal states: Chirp J and Chirp K. In the Chirp J state, only the D+ line is driven, and in the Chirp K state, only the D− line is driven.

During the reset, a physical device that supports a high-speed connection sends a Chirp K. A high-speed-capable physical host detects the Chirp K and responds with a series of alternating Chirp K and Chirp J. On detecting the pattern KJKJKJ, the physical device removes its full-speed pull-up and performs all further communications at high speed. If the physical host does not respond to the device's Chirp K, the physical device continues to communicate at full speed. In many examples, the physical device of the mobile media apparatus and the physical host of the docking station support a high-speed connection.

Subsequently, activity 331 of FIG. 4 includes a procedure 457 of establishing a physical communications pipe or physical signal path between the physical device and the physical host. In some examples, the physical host verifies that the physical device has exited the reset state by sending a standard USB request. A bit in the returned data indicates whether the physical device is still in the reset state. If necessary, the physical host repeats the physical request until the device has exited the reset state. When the physical host removes the reset state by letting one of D+ and D− go into a logical high state, the physical device is in the default state. The physical device's USB registers are in their reset states.

Activity 331 in FIG. 4 continues with a procedure 458 of determining the maximum packet size of the physical communications pipe. The physical host can send a standard USB request to the physical device to determine the maximum packet size of the data pipe. In some examples, the eighth byte of the device descriptor returned by the physical device contains the maximum supported packet size.

Next, activity 331 of FIG. 4 includes a procedure 459 of assigning a physical address to the physical device. When the reset is complete, the physical host assigns a unique address to the physical device by sending a standard USB request. The physical device sends the request for the new address using the default address and then implements the new address. All communications from this point on between the physical host and the physical device use the new address. The address is valid until the device is detached, the hub resets the port, and/or the system reboots, in some examples.

Subsequently, activity 331 of FIG. 4 includes a procedure 460 of determining the functionalities of the physical device. The physical host can send a standard USB request to the new address of the physical device to obtain the physical device descriptor of the physical device. The physical device descriptor can contain the maximum packet size, the number of configurations the device supports, and other basic information about the physical device. The physical host also can request one or more configuration descriptors specified in the physical device descriptor. A request for a physical configuration descriptor is actually a request for the physical configuration descriptor followed by all of its subordinate descriptors up to the number of bytes requested. Some configurations also have class- or vendor-specific descriptors.

Activity 331 in FIG. 4 continues with a procedure 461 of assigning and loading of a physical device driver. After learning about the physical device from its descriptors, the physical host determines the best driver to manage communications with the physical device. In some examples, the physical hosts can use a physical device's Vendor ID and Product ID to determine the best physical device driver. In many examples, the device driver includes instructions to start the virtual host.

Next, activity 331 of FIG. 4 includes a procedure 462 of determining a configuration of the physical device. In some examples, the physical host's device driver determines a configuration for the physical device. The physical host can communicate the configuration by sending a standard USB message with the desired configuration information. Upon receiving the message, the physical device implements the requested configuration. The physical device is now in the configured state and the device's interface(s) are enabled and ready to use. After completion of procedure 462, the initialization of the physical connection between the physical host and the physical device (i.e., activity 331) is complete.

Figure 5:
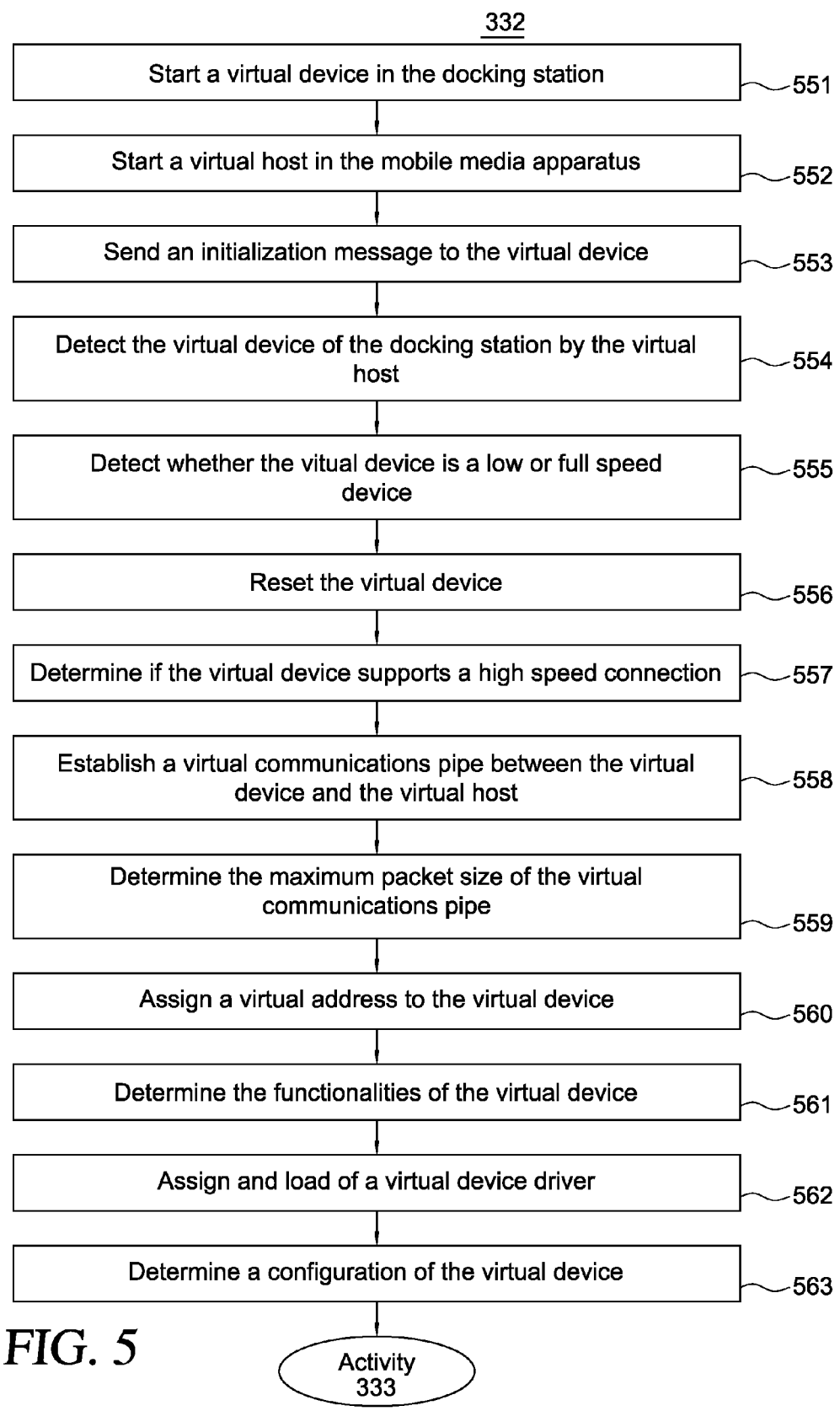
FIG. 5 is a flow chart illustrating an example of activity of initializing a virtual connection between a virtual host of the mobile media apparatus and a virtual device of the docking station, according to the first embodiment.

Referring back to FIG. 3, method 300 of FIG. 3 subsequently includes an activity 332 of initializing a virtual connection between a virtual host of the mobile media apparatus and a virtual device of the docking station. FIG. 5 is a flow chart illustrating an example of activity 332, according to the first embodiment. Activity 332 can be employed in many different embodiments or examples not specifically depicted or described herein. In some embodiments, the procedures of activity 332 can be performed in the order presented. In other embodiments, the procedures of activity 332 can be performed in any other suitable order. In still other embodiments, one or more of the procedures of activity 332 can be combined or skipped.

Referring to FIG. 5, the first procedure in activity 332 is a procedure 551 of starting a virtual device in the docking station. In some examples, the virtual device is started when the docking station is powered-on or when a boot sequence is run on the docking station (e.g., before activity 331). In other examples, the physical host in the docking station can start the virtual device as part of an initialization of the physical connection.

Activity 332 in FIG. 5 continues with a procedure 552 of starting a virtual host in the mobile media apparatus. In some examples, the virtual host is started when mobile media apparatus is powered-on or when a boot sequence is run on the mobile media apparatus (e.g., before activity 331). In other examples, the physical device in the mobile media apparatus can start the virtual host as part of the initialization of the physical connection.

In many examples, the rest of activity 332 can substantially mirror activity 331. That is, activity 331 (FIG. 5) can be similar to activity 332 (FIG. 4). In various embodiments, the virtual host and the virtual device can be substantially similar to or the same as a physical USB host and a physical USB device, except that instead of using a physical communications pipe (i.e., the coupled USB connectors) to communicate, the virtual host and the virtual device communicate through a virtual communications pipe created on top of the physical communications pipe between the physical host and the physical device.

For example, when the virtual host sends a message to the virtual device, the virtual host actually communicates the message to the physical device, which communicates the message to the physical host. The physical host can then communicate the message to the virtual device. Similarly, when the virtual device sends a message to the virtual host, the virtual device actually communicates the message to the physical host, which communicates the message to the physical device. The physical device can then communicate the message to the virtual host. In this way, a virtual connection or a virtual communications pipe can be established between the virtual host and the virtual device using the physical device and the physical host.

Figure 6:
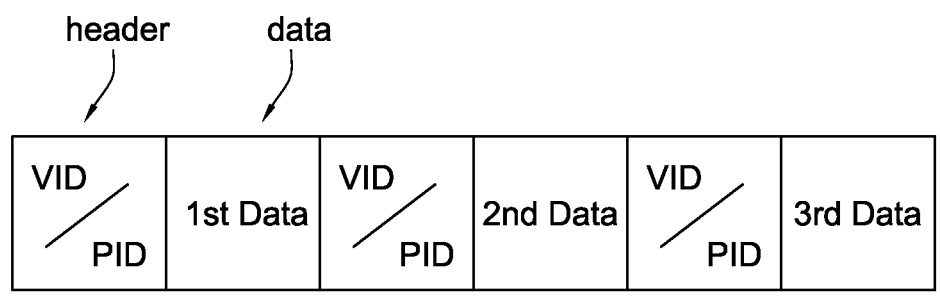
FIG. 6 illustrates an example of a packet configuration for use with the system of FIG. 1 and the method of FIG. 3, according to the first embodiment.

In some embodiments, the physical host and the physical device are implemented to comply with the USB specification. The USB specification allows users to create their own packet configuration. Accordingly, in some embodiments, the physical host and the physical device can use a packet configuration designed for use with the virtual host and the virtual device. FIG. 6 illustrates an example of a packet configuration for use with system 100 (FIG. 1) and method 300 (FIG. 3), according to the first embodiment.

Referring to FIG. 6, packet 600 can be configured to include one or more headers and one or more sets of data (i.e., the first data, the second data, and the third data). The headers can include a VID (USB vendor ID) and a PID (physical interface device ID). The VID is an identification number assigned to a specific vendor by USB Implementers Forum, Inc., the non-profit corporation that manages the USB standard, and the PID is a product specific number assigned by the vendor. The VID/PID combination can be used by the host and the device to determine the destination of the data. That is, the first data following the first VID/PID combination in packet 600 is sent to the electrical accessory or software application associated with the first PID. The second data following the second VID/PID combination in packet 600 is sent to the electrical accessory or software application associated with the second PID. Similarly, the third data following the third VID/PID combination in packet 600 is sent to the electrical accessory or software application associated with the third PID. In other examples, one or more of the headers can include just the VID or PID. In still other examples, the header can include different information, or the packet can have a different organization.

Referring again to FIG. 5, the next procedure in activity 332 is a procedure 553 of sending an initialization message to the virtual device to begin the initialization procedures. The sending of the initialization message can be the equivalent to the physical device beginning to draw electrical power from the physical host and the physical host detecting the drawings of electrical power (e.g., procedure 451 of FIG. 4).

Activity 332 in FIG. 5 continues with a procedure 554 of detecting the virtual device of the docking station by the virtual host. In some examples, the virtual host of mobile media apparatus can detect the virtual device of the docking station by receiving the initialization message sent in procedure 553. The receiving of the initialization message can be the equivalent or substitute to the physical host detecting the drawings of electrical power by the physical device (e.g., procedure 452 of FIG. 4) and/or informing the physical host of the physical device (e.g., procedure 453 of FIG. 4).

Subsequently, activity 332 of FIG. 5 includes a procedure 555 of detecting whether the virtual device of the docking station is a low or full speed device. The virtual host of the mobile media apparatus can determine whether the virtual device of the docking station is low or full speed by sending a request to the virtual device for this information. In many embodiments, the speed of the virtual connection can be the same speed as the physical connection. For example, the virtual device can determine the speed of the physical connection between the physical host and the physical device and send a response to the request from the virtual host. In the same or different embodiments, the virtual device of the docking station and the virtual host of the mobile media apparatus can be a full speed virtual device and a full speed virtual host, respectively. This procedure can be equivalent to or a substitute for detecting the speed of the physical device (e.g., procedure 454 of FIG. 4).

Activity 332 in FIG. 5 continues with a procedure 556 of resetting the virtual device. The virtual host can send a request that instructs the virtual device to reset. This procedure can be equivalent to or a substitute for the resetting of the physical device (e.g., procedure 455 of FIG. 4).

Next, activity 332 of FIG. 5 includes a procedure 557 of determining if the virtual device supports a high-speed connection. The docking station can detect whether the virtual device supports high speed using two special signal states: virtual Chirp J or virtual Chirp K. In many examples, the virtual host can send a request to determine if the virtual device supports a high-speed connection. A virtual device that supports a high speed connection sends a response with a virtual Chirp K. A high-speed-capable virtual host can receive the response with the virtual Chirp K and responds with one or more messages with a series of alternating virtual Chirp K and virtual Chirp J. On receiving the packet with the virtual KJKJKJ pattern, the virtual device performs all further communications at high speed. If the virtual host does not respond to the device's virtual Chirp K, the virtual device continues to communicate at full speed. In many examples, the virtual device of the docking station and the virtual host of the mobile media apparatus support a high-speed connection. In other embodiments, the virtual host and the virtual device communicate at the same speed as the physical host and the physical device, and procedure 557 can be skipped. This procedure can be equivalent to or a substitute for determining if the physical device supports a high-speed connection (e.g., procedure 456 of FIG. 4).

Subsequently, activity 332 of FIG. 5 includes a procedure 558 of establishing a virtual communications pipe or virtual signal path between the virtual device and the virtual host. In some examples, the virtual host verifies that the virtual device has exited the reset state by sending a standard USB request. A bit in the returned data indicates whether the virtual device is still in the reset state. If necessary, the virtual host repeats the request until the device has exited the reset state. This procedure can be equivalent to or a substitute for establishing a physical communications pipe (e.g., procedure 457 of FIG. 4).

Activity 332 in FIG. 5 continues with a procedure 559 of determining the maximum packet size of the virtual communications pipe. The virtual host can send a standard USB request to the virtual device to determine the maximum packet size of the virtual communications pipe. In some examples, the eighth byte of the device descriptor returned by the virtual device contains the maximum packet size supported. This procedure can be equivalent to or a substitute for determining the maximum packet size of the physical communications pipe (e.g., procedure 458 of FIG. 4).

Next, activity 332 of FIG. 5 includes a procedure 560 of assigning a virtual address to the virtual device. When the reset is complete, the virtual host assigns a unique virtual address to the virtual device by sending a standard USB request. The virtual device sends the request for the new address using the default virtual address and then implements the new virtual address. All communications from this point on between the virtual host and the virtual device use the new virtual address. The virtual address is valid until the physical host is detached, a hub resets the port, and/or the system reboots, in some examples. This procedure can be equivalent to or a substitute for assigning the physical address to the physical device (e.g., procedure 459 of FIG. 4).

Subsequently, activity 332 of FIG. 5 includes a procedure 561 of determining the functionalities of the virtual device. The virtual host can send a standard USB request to the new virtual address of the virtual device to obtain the device descriptor of the virtual device. The virtual device descriptor can contain the maximum packet size, the number of configurations the virtual device supports, and other basic information about the virtual device. The host can also request one or more configuration descriptors specified in the virtual device descriptor. A request for a virtual configuration descriptor is actually a request for the virtual configuration descriptor followed by all of its subordinate descriptors up to the number of bytes requested. Some configurations also have class- or vendor-specific descriptors. This procedure can be equivalent to or a substitute for determining the functionalities of the physical device (e.g., procedure 460 of FIG. 4).

Activity 332 in FIG. 5 continues with a procedure 562 of assigning and loading of a virtual device driver. The virtual host determines the best driver to manage communications with the virtual device. In many examples, the virtual device driver is a specific virtual device driver to handle communications between the docking station and mobile media apparatus using the virtual host and the virtual device. This procedure can be equivalent to or a substitute for assigning and loading of the physical device driver (e.g., procedure 461 of FIG. 4).

Next, activity 332 of FIG. 5 includes a procedure 563 of determining a configuration of the virtual device. In some examples, the virtual host's device driver determines a configuration for the virtual device. The virtual host can communicate the configuration by sending a standard USB message with the desired configuration information. Upon receiving the message, the virtual device implements the requested configuration. The virtual device is now in the configured state, and the device's interface(s) are enabled and ready to use. This procedure can be equivalent to or a substitute for determining the configuration of the physical device (e.g., procedure 462 of FIG. 4).

After completion of procedure 563, the initialization of the virtual connection between the virtual host and the virtual device (i.e., activity 332) is complete. Referring back again to FIG. 3, method 300 of FIG. 3 includes an activity 333 of providing electrical power to the mobile media apparatus. In some examples, the docking station provides electrical power to the mobile media apparatus when a USB connector of the docking station is coupled to a USB connector of the mobile media apparatus. In various embodiments, the docking station provides the electrical power via the coupled USB connectors. In many examples, the docking station starts providing electrical power after activity 331 or 332. In other examples, the docking station starts providing electrical power during the initialization of the physical connection between the physical host and the physical device.

Next, method 300 of FIG. 3 includes an activity 334 of polling the physical device. Under the USB specification, a host initiates communication between the host and the device. Accordingly, if the physical device has data to communicate to the physical host, the physical device cannot communicate the data to the physical host without a request from the physical host. In many examples, the physical host can poll the physical device to determine if the physical device (i.e., the virtual host) has data to transfer to the physical host. In some embodiments, the physical host can poll the physical device at regular, short intervals when no data transfer is occurring between the physical host and the physical device. For example, the physical host can poll the physical device every ten, one hundred, or one thousand milliseconds.

Next, method 300 of FIG. 3 includes an activity 335 of transferring data between the virtual host of the mobile media apparatus and the virtual device of the docking station. In some embodiments, the virtual host can receive data to send to the docking station from an electrical accessory or software application running on the mobile media apparatus.

For example, the virtual host or the physical device can package first data into one or more packets consistent with the packet configuration illustrated in FIG. 6. The physical device waits until the physical host asks if the physical device has any data to transmit and then transmits the data to the physical host. The physical host or the virtual device can unpack the first data, and the hub can transfer the first data to the specified recipient of the first data.

In the same or a different example, the virtual device or the physical host can package the second data into one or more packets consistent with the packet configuration of FIG. 6. After the virtual device receives the request for data from the virtual host, the physical host can transmit the second data to the physical device. The physical device or the virtual host can unpack the second data, and the hub can transfer the data to the specified recipient of the second data.

Activity 335 of transferring the data between the virtual host of the mobile media apparatus and the virtual device of the docking station can be repeated, as necessary, until the mobile media apparatus is uncoupled from the docking station. When the mobile media apparatus is uncoupled from the docking station, the virtual communications pipe and the physical communications pipe are broken. The physical host and the physical device can notify the virtual device and the virtual host, respectively, as well as perform the standard USB disconnection protocol. The virtual device and the virtual host can also implement a USB disconnection protocol and notify electrical accessories and software applications of the disconnection.

Turning to another embodiment, FIG. 7 illustrates an interaction flow chart of a method 700 of communicating between a mobile media apparatus and a docking station, according to a second embodiment. Method 700 is merely exemplary and is not limited to the embodiments presented herein. Method 700 can be employed in many different embodiments or examples not specifically depicted or described herein. In some embodiments, the activities, the procedures, and/or the processes of method 700 can be performed in the order presented. In other embodiments, the activities, the procedures, and/or the processes of the method 700 can be performed in any other suitable order. In still other embodiments, one or more of the activities, the procedures, and/or the processes in method 700 can be combined or skipped.

Referring to FIG. 7, method 700 includes an activity 730 of starting the virtual device. In some examples, activity 730 can be similar to procedure 551 of activity 332 in FIG. 5.

Next, method 700 of FIG. 7 includes an activity 731 of coupling a mobile media apparatus to a docking station. In some examples, activity 731 can be similar to activity 330 in FIG. 3.

Method 700 in FIG. 7 continues with an activity 732 of detecting electrical power by the mobile media apparatus. In some examples, activity 732 can be similar to procedure 451 and/or 452 of activity 331 in FIG. 4.

Subsequently, method 700 of FIG. 7 includes an activity 733 of detecting the mobile media apparatus by the docking station. In some examples, activity 733 can include, in part, the physical host enumerating the physical device and transmitting the enumeration information to the physical device.

Next, method 700 of FIG. 7 includes an activity 734 of detecting a physical connection between the mobile media apparatus and the docking station. In some examples, activity 734 can include, in part, the mobile media apparatus providing the VIDs and PIDs for electrical accessories coupled to the physical device to the physical host.

Method 700 in FIG. 7 continues with an activity 735 of registering and enumerating devices. In some examples, activity 735 can include, in part, the physical host registering the electrical accessories coupled to the physical host using the VIDs and PIDs provided by the mobile media apparatus. In addition, as part of activity 735, the physical host can provide the enumeration information to the mobile media apparatus. In some examples, no information is provided about the electrical accessories because the virtual host and virtual device will handle and control the connection with the electrical accessories.

Subsequently, method 700 of FIG. 7 includes an activity 736 of configuring the physical device. In some examples, activity 736 can include, in part, configuring the physical device and the electrical accessories. After the physical device has completed its configuration processes, the physical device can send an acknowledgement to the physical host.

After activity 736, method 700 of FIG. 7 continues with an activity 737 of starting the virtual host. In some examples, activity 737 can be similar to procedure 552 of activity 332 in FIG. 5.

Also after activity 736, method 700 in FIG. 7 continues with an activity 738 of configuring the physical host.

Subsequently, method 700 of FIG. 7 includes an activity 739 of notifying the virtual device of the new physical connection. In some examples, activity 739 can be similar to procedure 553 and/or 554 of activity 332 in FIG. 5.

Next, method 700 of FIG. 7 includes an activity 740 of detecting the docking station (or virtual device) by the virtual host. In some examples, activity 740 can include, in part, the virtual host enumerating the virtual device and transmitting the enumeration information to the virtual device.

Method 700 in FIG. 7 continues with an activity 741 of detecting a virtual connection between the mobile media apparatus and the docking station by the virtual device. In some examples, activity 741 can include, in part, the mobile media apparatus providing the VIDs and PIDs for electrical accessories coupled via the virtual device to the virtual host.

Subsequently, method 700 of FIG. 7 includes an activity 742 of registering and enumerating devices. In some examples, activity 742 can include, in part, the virtual host registering the electrical accessories coupled to the virtual host using the VIDs and PIDs provided by the mobile media apparatus. In addition, as part of activity 742, the virtual host can provide the enumeration information to the mobile media apparatus.

Next, method 700 of FIG. 7 includes an activity 743 of configuring the virtual device. In some examples, activity 743 can include, in part, configuring the virtual device and the electrical accessories. After the virtual device has completed its configuration processes, the virtual device can send an acknowledgement to the virtual host.

Method 700 in FIG. 7 continues with an activity 744 of configuring of virtual host.

Subsequently, method 700 of FIG. 7 includes an activity 745 of providing a data transfer request to the virtual host. In some examples, a user or an electrical accessory in or coupled to the mobile media apparatus can provide data to the virtual host that needs to be transmitted to the docking station.

Next, method 700 of FIG. 7 includes an activity 746 of transferring the data to the virtual device. In some examples, the virtual host (and the physical device) can transmit the data to the virtual device (and the physical host).

Method 700 in FIG. 7 continues with an activity 747 of receiving and processing the data. In some examples, the virtual device (and/or the physical host) can process the data received from the mobile media apparatus.

Subsequently, method 700 of FIG. 7 includes an activity 748 of providing data to the virtual device to transfer. In some examples, a user or an electrical accessory in or coupled to docking station can provide data to the virtual device that needs to be transmitted to the mobile media apparatus.

Next, method 700 of FIG. 7 includes an activity 749 of sending a data transfer request. In some examples, the virtual device can send a request to the virtual host to transfer data from the virtual device to the virtual host. In some examples, the virtual device cannot transmit the data to the virtual host until the virtual device receives a request for data from the virtual host.

Subsequently, method 700 of FIG. 7 includes an activity 750 of receiving the request to transfer data and allowing the data transfer to proceed. The virtual host can receive the request to transfer data and allow the virtual device to transfer data to the virtual host.

Method 700 in FIG. 7 continues with an activity 751 of transferring the data to the virtual host. In some examples, the virtual device (and the physical host) can transfer the data to the virtual host (and the physical device).

Subsequently, method 700 of FIG. 7 includes an activity 752 of receiving and processing the data. In some examples, the virtual host (and/or the physical device) can process the data received from the docking station.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system configured to communicate to and from a media device, the media device having a first controller, the system comprising:
   a physical device module configured to run on the first controller;
   a virtual host module configured to run on the first controller;
   a docking station comprising:
      a second controller;
      an electrical connector configured to couple to the media device;
      a physical host module configured to run on the second controller;
      a virtual device module configured to run on the second controller; and
      one or more accessory devices configured to communicate with the media device using the virtual device module; and
   one or more installation modules configured to run on the first controller and further configured to install the virtual host module in an operating system of the media device, wherein:
      the physical host module and the physical device module are configured to establish a physical communications pipe between the media device and the docking station;
      the virtual host module and the virtual device module are configured to establish a virtual communications pipe between the media device and the docking station using the physical communications pipe;
      the physical host module and the virtual device module are configured to run on the second controller simultaneously; and
      the virtual host module and the physical device module are configured to run on the first controller simultaneously.

2. The system of claim 1, wherein:
   the physical device module is a universal serial bus physical device module; and the physical host module is a universal serial bus physical host module.

3. The system of claim 2, wherein:
the virtual device module is a universal serial bus virtual device module; and
the virtual host module is a universal serial bus virtual host module.

4. The system of claim 1, wherein:
the docking station is configured to provide electrical power to the media device while the electrical connector of the docking station is physically and electrically coupled to the media device and while the virtual communications pipe exists between the virtual host module and the virtual device module.

5. The system of claim 1, wherein:
the media device comprises:
    an electrical connector configured to couple to the electrical connector of the docking station; and
    at least one of a cellular phone, a personal digital assistant, or a smart phone; and the one or more accessory devices comprise:
    at least one of a telephone network adapter or an Ethernet adapter.

6. The system of claim 1, wherein:
the electrical connector of the docking station comprises a universal serial bus connector.

7. The system of claim 1, wherein:
the one or more installation modules are further configured to install the physical device module in the operating system of the media device.

8. The system of claim 1, wherein:
the docking station further comprises:
    a second electrical connector configured to couple to a data network.

9. The system of claim 1, wherein:
the docking station further comprises:
    a power converter module configured to receive first electrical power from an external power source and further configured to provide second electrical power to the media device while the virtual communications pipe exists between the virtual host module and the virtual device module.

10. The system of claim 9, wherein:
the electrical connector of the docking station comprises:
    one or more power pins; and
    one or more data pins;
the electrical connector of the docking station is configured to provide the second electrical power from the power converter module to the media device via the one or more power pins; and
the electrical connector of the docking station is configured such that the physical host module of the docking station communicates with the physical device module of the media device via the one or more data pins.

11. A mobile media apparatus configured to communicate with a docking station, the mobile media apparatus having a first electrical connector and a controller, the first electrical connector configured to couple to the docking station, the docking station comprising a physical host and a virtual device, the mobile media apparatus comprising:
    a virtual host configured to run on the controller;
    a physical device configured to run on the controller simultaneous with the virtual host and further configured to communicate with the physical host of the docking station using the first electrical connector such that a physical signal path is created with the physical host of the docking station when the first electrical connector of the mobile media apparatus is coupled to the docking station; and
    one or more installation modules configured to run on the controller and further configured to install the virtual host in an operating system of the mobile media apparatus, wherein:
    the virtual host is further configured to establish a virtual signal path with the virtual device of the docking station over the physical signal path when the first electrical connector of the mobile media apparatus is coupled to the docking station;
    the virtual host is further configured to control communications with the virtual device of the docking station using the virtual signal path;
    the physical device is further configured such that communications using the physical signal path by the physical device is controlled by the physical host of the docking station; and
    the virtual host is further configured to communicate data to the virtual device of the docking station using the virtual signal path when the first electrical connector of the mobile media apparatus is coupled to the docking station and while the first electrical connector of the mobile media apparatus is receiving electrical power from the docking station.

12. The mobile media apparatus of claim 11, wherein:
the physical device is a universal serial bus physical device; and
the virtual host is a universal serial bus virtual host.

13. A mobile media apparatus configured to communicate with a docking station, the mobile media apparatus having a first electrical connector and a controller, the first electrical connector configured to couple to the docking station, the docking station comprising a physical host and a virtual device, the mobile media apparatus comprising:
    a virtual host configured to run on the controller;
    a physical device configured to run on the controller simultaneous with the virtual host and further configured to communicate with the physical host of the docking station using the first electrical connector such that a physical signal path is created with the physical host of the docking station when the first electrical connector of the mobile media apparatus is coupled to the docking station; and
    one or more installation modules configured to run on the controller and further configured to install the virtual host in an operating system of the mobile media apparatus, wherein:
    the one or more installation modules are further configured to install the physical device in the operating system of the mobile media apparatus;
    the virtual host is further configured to establish a virtual signal path with the virtual device of the docking station over the physical signal path when the first electrical connector of the mobile media apparatus is coupled to the docking station;
    the virtual host is further configured to control communications with the virtual device of the docking station using the virtual signal path;
    the physical device is further configured such that communications using the physical signal path by the physical device is controlled by the physical host of the docking station; and
    the virtual host is further configured to communicate data to the virtual device of the docking station using the virtual signal path when the first electrical connector of the mobile media apparatus is coupled to the docking station and while the first electrical connector of the mobile media apparatus is receiving electrical power from the docking station.

14. A method of communicating between a mobile media apparatus and a docking station, the mobile media apparatus comprises a virtual host and a physical device, the docking station comprises a physical host and a virtual device, the method comprising:
   installing the virtual host in an operating system of the mobile media apparatus;
   initializing a physical connection between the physical device of the mobile media apparatus and the physical host of the docking station when the docking station is coupled to the mobile media apparatus;
   after initializing the physical connection and while the physical connection exists, initializing a virtual connection between the virtual host of the mobile media apparatus and the virtual device of the docking station wherein the virtual connection is using the physical connection; and
   transferring data between the virtual host of the mobile media apparatus and the virtual device of the docking station using the virtual connection while the mobile media apparatus is receiving electrical power from the docking station and while the docking station is coupled to the mobile media apparatus.

15. The method of claim 14, wherein:
initializing the physical connection comprises performing a universal serial bus connection initialization.

16. The method of claim 14, further comprising:
providing the electrical power to the mobile media apparatus using the docking station, wherein:
providing the electrical power comprises:
   providing the electrical power to a first electrical connector of the mobile media apparatus from a first electrical connector of the docking station when the first electrical connector of the docking station is coupled to the first electrical connector of the mobile media apparatus;
transferring the data comprises:
   transferring the data between the virtual host of the mobile media apparatus and the virtual device of the docking station using the virtual connection while the first electrical connector of the mobile media apparatus is receiving the electrical power from the first electrical connector of the docking station and while the first electrical connector of the docking station is coupled to the first electrical connector of the mobile media apparatus; and
the physical connection and the virtual connection transfer data between the first electrical connector of the mobile media device and the first electrical connector of the docking station.

17. The method of claim 16, further comprising:
receiving the electrical power from an external power source.

18. The method of claim 14, wherein:
installing the physical device in the operating system of the mobile media apparatus.

19. A system configured to communicate from a media device to a docking station and from the docking station to the media device, the media device having a first controller and a physical device module, the docking station having a second controller and a physical host module, the physical device module configured to run on the first controller, the physical host module configured to run on the second controller, the system comprising:
   a virtual host module configured to run on the first controller;
   a virtual device module configured to run on the second controller; and
   one or more installation modules configured to run on the first controller and further configured to install the virtual host module in an operating system of the media device, wherein:
   the physical host module and the physical device module are configured to establish a physical communications pipe between the media device and the docking station; and
   the virtual host module and the virtual device module are configured to establish a virtual communications pipe between the media device and the docking station using the physical communications pipe and while the physical communications pipe exists.

20. The system of claim 19, further comprising:
the physical device module; and
the physical host module.

21. The system of claim 19, wherein:
the one or more installation modules are further configured to install the physical device module in the operating system of the media device.

* * * * *